United States Patent [19]

Hayes

[11] 4,409,489
[45] Oct. 11, 1983

[54] ROAD TRAFFIC ACTUATED GENERATOR

[76] Inventor: Thomas J. Hayes, 11 W. 17th St., New York, N.Y. 10011

[21] Appl. No.: 305,340

[22] Filed: Sep. 24, 1981

Related U.S. Application Data

[63] Continuation-in-part of Ser. No. 191,304, Sep. 26, 1980, abandoned.

[51] Int. Cl.³ .......................... F03G 5/00; F04B 9/14; F04B 43/12
[52] U.S. Cl. .................................... 290/1 R; 417/229
[58] Field of Search .............. 290/1 R; 417/229, 333; 340/31 R; 404/32-34, 36, 42, 46, 47

[56] References Cited

U.S. PATENT DOCUMENTS

| | | | |
|---|---|---|---|
| 3,094,907 | 6/1963 | Hirst | 404/32 |
| 3,183,626 | 5/1965 | Schmitt | 404/47 |
| 4,004,422 | 1/1977 | Le Van | 60/533 |
| 4,212,598 | 7/1980 | Roche et al. | 417/229 |
| 4,309,150 | 1/1982 | Payne | 417/229 |

FOREIGN PATENT DOCUMENTS

| | | | |
|---|---|---|---|
| 54-125335 | 9/1979 | Japan | 417/231 |
| 380792 | 9/1932 | United Kingdom | 404/32 |

*Primary Examiner*—J. V. Truhe
*Assistant Examiner*—Shelley Wade
*Attorney, Agent, or Firm*—Kenyon & Kenyon

[57] ABSTRACT

An apparatus is described which pressurizes fluid and causes it to flow by capturing energy dissipated by moving vehicles. The apparatus is a network of collapsible bodies containing a working fluid which is attached to a turbine generator system. The bodies are resilient tubes, preferably three part structures made of elastic, inner tubes with projections and outer sections of semi-rigid hose. The network may be overlayed with a flexible sheet which distributes the weight and motion of the vehicle.

27 Claims, 15 Drawing Figures

ROAD TRAFFIC ACTUATED GENERATOR

This is a continuation-in-part of co-pending application Ser. No. 191,304 filed Sept. 26, 1980 now abandoned.

BACKGROUND OF THE INVENTION

This invention relates to a method and apparatus for the production of mechanical or electrical energy from energy generated by a moving vehicle. More particularly, the invention relates to a method and apparatus for utilizing the motion of a vehicle to pump a fluid and for recovering energy from the fluid so pumped.

Related systems for capturing kinetic energy from a moving vehicle have been described in the art. These systems include a ratchet and pinion arrangement movably connected to a hinged plate within a road bed, a piston or a spring system connected to a road bed hit plate and an associated eccentrically mounted rod and gear arrangement, a magnetic system moved by attraction of a moving vehicle, a road bed hit plate air compressor, and a fluid filled bag arrangement upon a road bed which causes fluid to flow under pressure when the bags are compressed by the moving vehicle.

In general, these systems suffer disadvantages. Their designs allow only momentary contact with the passing vehicle which prevents significant capture of dissipating kinetic energy. Their mechanical arrangements create large variations in the road bed surface which cause a bumpy ride and an uncomfortable sensation in the overpassing vehicle. Finally, they require permanent installation and cannot be temporarily positioned on top of an existing road surface and are expensive to build.

The bag system described in Japanese application Ser. No. 53-33958, publication No. 54-125335, is a pumping system for pressurized fluid flow which is transversely arranged to the direction of vehicular travel. While the system possibly can be temporarily installed upon a road bed surface, the fluid pressures it is capable of generating are not significant, the fluid is not substantially completely expelled during compression and the system is subject to failure. The design and structure of the system bags necessitate a great degree of flexion and extension of the bag walls during compression. The resulting strain causes fatigue and eventual failure of the walls. The single uniform wall design of the bags prevents their substantially complete collapse, the expulsion of all the fluid therein and subsequent efficient expansion by their resilient restoring force. The surface of the system contacting the vehicle does not permit wide distribution of the vehicular weight and the kinetic energy being dissipated. Consequently, this bag system does not produce a high pressure head of working fluid and will fail after a short time in use.

Therefore, it is an object of the present invention to design and produce a pressurized fluid tubing network which can be temporarily installed on a roadway and will capture the dissipating kinetic energy of a moving vehicle. Another object is the design and production of tubes for the network which are collapsible, permit expulsion of the working fluid and yet have a resiliency which will draw in the working fluid after vehicular pressure is removed. A further object is the construction of a tubing arrangement which does not undergo extreme flexion and expansion during the compressive cycle and will not be subject to elastomer expansive failure. Yet another object is the design of a roadway surface overlaying the tubing network which simulates the normal roadway, permits easy and efficient control of the vehicle and distributes the vehicular pressure over a wide area of the network.

SUMMARY OF THE INVENTION

These and other objects are achieved by the invention which is directed to an apparatus for recovering energy from a moving vehicle on a roadway by causing a working fluid to flow therein. According to the invention, there has been developed a network of resilient, elastic, collapsible bodies with inlets and outlets which are appropriately connected to input and output manifolds and provide a pressurized volume of working fluid when compressed by a moving vehicle. A travel surface adapted for the passage of a vehicle overlays the network which in turn lies on top of a road bed. The input and output manifolds may be positioned upon the road bed or adjacent to it and appropriately serve as the connections between a working fluid source, a means for converting the energy of the pressurized working fluid into mechanical or electrical energy and a means for accumulating a pressure head of working fluid.

The collapsible bodies of the network pressurize the working fluid. They are substantially completely collapsible so as to expel substantially all of the working fluid contained therein and are resilient so as to draw in supplemental working fluid after the comrpressive force is removed.

The collapsible nature of the bodies is derived from their partially flattened shape adopted when they are unassembled and do not contain working fluid. The resilient nature is derived from the use of shape retaining material in the upper and lower walls of the bodies. Accordingly, each body comprises an elastic tube having a naturally floppy or partially flattened shape in an unassembled state and stiffened upper and lower walls which are shape retaining. In one embodiment, the upper and lower elastomer walls of the tube can be stiffened by combining the elastomer in this vicinity with a substantially semiflexible polymer when the tube is being produced. The tube can also be formed with upper and lower wall surface ribs or a similar thickening shape which will provide stiffening and shape retention. Additional semiflexible polymer may also be added to the thickened portion. The lateral sides of the tube along the longitudinal dimension remain highly elastic and naturally floppy.

In another embodiment, upper and lower wall semiflexibility can be provided by cross linking the polymeric elastomer in the vicinity of the upper and lower portions while the tube is maintained in the desired shape. The cross-linking will provide a stiffening effect within the tube walls along these areas.

In each embodiment, the elastic lateral, longitudinally directed sides of the bodies are designed so that in an unassembled state their natural curvatures have a radial angle less than that of a corresponding section of a circle. With this lateral side design, the body walls in the vicinity of the lateral sides do not undergo high flexion and expansion with respect to their relaxed state. Substantially complete collapse is produced thereby and wall fatigue or failure is substantially lessened.

In a preferred embodiment, each body comprises an inner elastic tube and outer, upper and lower sections of semirigid hose. The tube has upper and lower portions with integral projections extending horizontally from the longitudinal sides of each portion. Each pair of upper and lower projections of the corresponding portions of the tube form a unitary, unbroken protrusion from the side of the tube, or are permanently or detachably joined. The upper and lower portions of the tube are concentrically associated with the corresponding upper and lower sections of hose and are permanently bonded thereto. The hose sections have a smaller radial dimension than the corresponding tube portions in an expanded, unassembled state.

In an unassembled state, the inner tube has a naturally collapsed, substantially flat cross sectional shape. When in an assembled state, the projections of the tube extend outward and horizontally from between the longitudinal edges of the hose sections.

The inner tube may be formed from two flat continuously aligned strips of elastomer mechanically or chemically joined along the longitudinal edges or may be a unitary, unbroken structure of extruded, molded, pressed or otherwise formed elastomer wherein each upper projection is continuous with the corresponding lower projection. The former tube embodiment comprises two parts joined together. The latter tube embodiment is a one piece continuous tube with horizontal protrusions which are the pairs of upper and lower projections.

The sections of hose may be constructed of resilient elastomer having semirigid characteristics. A preferred embodiment is a ribbed hose section.

The travel surface which is adapted for passage of a vehicle comprises a stiff, but flexible, pressure sheet lying over the bodies. The pressure sheet distributes the pressure laterally and to a somewhat smaller extent longitudinally. In a preferred embodiment, the pressure sheet is a mat of rigid, strong, substantially box-shaped solid segments arranged in series with their long dimensions substantially perpendicular to the direction of vehicular travel and interconnected by flexible joints. The segments may be wood or concrete and the joints may be flexible elastomer strips mechanically joined or chemically bonded to the segments. In a further preferred embodiment, the pressure sheet is constructed of strips and segments each with two rows of mutually aligned vertical holes. Bolts are placed through the holes and double holed metal washers are fitted over each pair of aligned bolts derived from the row of bolts in each strip and the adjacent row of bolts in each segment. A second double holed metal washer is fitted over each pair of aligned bolts in the segments. In another preferred embodiment, a flexible plastic plate is joined to the bottom of the series of segments interconnected by flexible joints.

The positional arrangement of the bodies of the network, with respect to the direction of vehicular travel may be any configuration that causes expulsion of fluid therefrom. A particularly preferred embodiment is an arrangement wherein the longitudinal dimension of each body is substantially parallel to the direction of vehicular travel. Another preferred network embodiment is one wherein the longitudinal dimension of each body is substantially diagonally arranged with the direction of vehicular travel.

An especially preferred embodiment of the network having a diagonal arrangement of the bodies is a herringbone configuration with the outlets of the bodies connected to an output manifold positioned substantially in the middle of the network and the inlets connected to input manifolds positioned along either longitudinal edge of the network. The output and input manifolds are positioned substantially parallel to the direction of vehicular travel.

This herringbone network can be constructed so that each input and output manifold is resilient, collapsible and has the same overall structural characteristics as the collapsible bodies. They preferably comprise an elastic inner tube of two portions with projections extending horizontally from the longitudinal sides of each of the upper and lower portions and outer, upper and lower sections of semirigid hose. The manifolds may have a cross sectional shape the same as or different from that of the bodies. When the cross sectional shape is substantially eliptical, the long axis will preferably be horizontal. In a further preferred version of this embodiment, the cross sectional shape of the output manifold is substantially eliptical with the vertical dimension being essentially the same as the diameter of the bodies and the horizontal dimension being substantially larger than the diameter of the bodies.

An especially preferred embodiment of the network is one wherein the bodies and, if desired, the manifolds are integrated as a network blanket. Two large sheets of elastomer are press molded or otherwise processed to form the tubes of the bodies and, if desired, the tubes of the input and output manifolds. When using a three part structure body design of the invention, individual sections of semirigid hose sized to fit the molded tubes are then chemically bonded in a concentric fashion to the press molded elastomer sheets. The connective junctions between the bodies and the manifolds in the blanket can be additionally molded to form flexible one way valves therein or one way valves can be later attached at appropriate positions within the network blanket. This integrated construction produces a tubing blanket containing the network which can be placed on the roadway and connected to the other operating features of the apparatus.

The invention further comprises a compressible road bed pump which avoids the use of tubing. Pumping is achieved by a flexible upper, vertically actuated piston element which movably connects with wall members of a lower trough and together with the wall members, defines a compression space for working fluid. Resiliency is provided by a spring means connecting the piston and the floor of the trough. The compression space has an inlet and outlet connected to the remainder of the apparatus described above.

BRIEF DESCRIPTION OF THE DRAWINGS

The drawings depict several preferred embodiments of the overall design of the invention as well as a schematic plan of the invention and the detailed design of several embodiments of the collapsible bodies and manifolds.

DETAILED DESCRIPTION OF THE INVENTION

Figure 1:
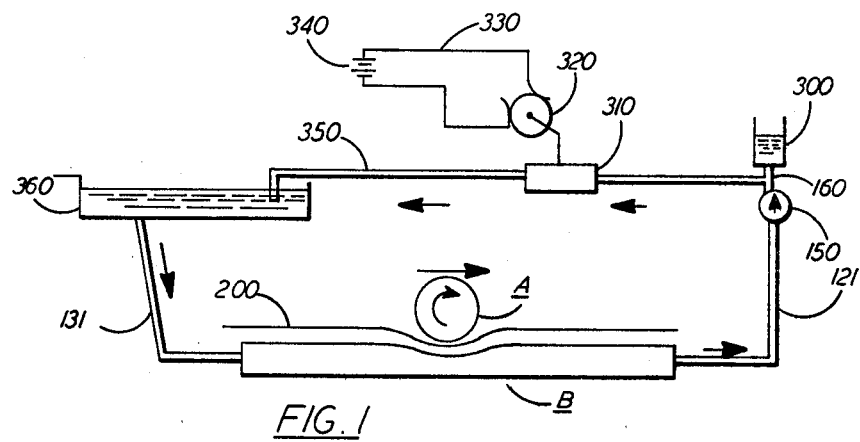
FIG. 1 is a schematic representation of the basic principle for generating electricity from the motion of a vehicle, according to the invention.

According to the invention, a network of elastic, collapsible bodies which contains a working fluid is placed upon a roadway where it is compressed by passage of a vehicle thereover and expells fluid. The fluid is propelled into storage in an elevated reservoir, water tower or pressure head accumulator such as a pressure tank or other accumulator, while also being fed to a turbine. The turbine may be connected to machines using the mechanical energy produced or may drive a generator. During intervals between vehicles, fluid stored in the elevated reservoir or other accumulator drives the turbine.

When employing a turbine-generator, the energy of the pressure head of fluid is converted into electricity which may be used directly or stored in a battery. When traffic over the road bed is intermittent and stored fluid in the reservoir or accumulator is depleted, energy stored in the battery may be drawn upon when needed. Typically, the electrical generating system will comprise a DC arrangement. An AC system may also be adapted for use provided that a relatively constant amount of power is distributed to the generator by the turbine. The working fluid will typically be water but also may be a gas such as freon or air.

An important feature of the invention is the resilient return, variably structured collapsible bodies which comprise the pumping tubes and may additionally comprise the input and output manifolds. The structure is substantially completely collapsible but is capable of spontaneously returning to an expanded shape because of its resilient nature. Resiliency causes a lowered pressure inside a body which has been voided and draws in supplemental working fluid from a working fluid source connected thereto. The structure is designed so that the walls do not undergo flexion, compression or expansion through an extreme radial curvature with respect to the relaxed state. The design also avoids failure of the walls which typically results from repreated flexion and compression of known, circular, uniform walled elastic tubing or hose.

The collapsible nature of the bodies is derived from their partially flattened shape adopted when they are unassembled and emptied of working fluid. The resilient nature is derived from the use of shape retaining material in the upper and lower walls of the bodies. The elastic, longitudinally directed, lateral sides of the bodies are designed so that, in an unassembled state, their natural curvatures have a radial angle less than that of a corresponding section of a circle. With this design, the body walls in the vicinity of the lateral sides along the portions, which would be the longitudinal edges produced when the bodies are substantially completely collapsed, do not undergo high flexion and expansion with respect to their relaxed or unstressed state, i.e., the state naturally adopted in an unassembled, unstressed arrangement. Substantially complete collapse is produced thereby and wall fatigue or failure is substantially lessened.

Each body can be an elastic tube having a naturally floppy and partially flattened shape in an unassembled state. The upper and lower walls, as defined by a horizontal plane along the long cross sectional axis of the partially flattened shape, are stiffened and are shape retaining. This may be accomplished by combining a substantially semirigid polymer with the elastomer in the upper and lower walls, by providing these walls with a thickened shape which is continuous or segmented, by adding semirigid polymer to such thickened walls, by cross linking the elastomer in the upper and lower wall vicinity and by employing other similar stiffening operations upon these walls. The tubes may be of a unitary, continuous structure or two parts chemically or mechanically joined to form respectively the upper and lower walls. The polymers and elastomers required for production of these properties are known to those skilled in the art.

A preferred embodiment of the body is a three part structure having inner and outer parts. The inner part of the structure is an elastic inner tube and the two other parts are outer, upper and lower sections of semirigid hose. The elastic, flexible inner tube has a naturally collapsed, substantially flat cross sectional shape in an unassembled state. That is, before the outer sections of hose have been permanently bonded to the outside walls of the inner tube, the inner tube inside walls contact each other at substantially all points and the tube has very little or no internal residual volume. The tube comprises upper and lower portions which are defined by a horizontal plane through integral projections which extend horizontally from the longitudinal sides of each portion. Each pair of upper and lower projections may form a unitary, unbroken protrusion from each side of the tube or are permanently or detachably joined. The overall cross sectional shape of the tube may be any shape providing substantially complete collapse upon compression. Typically, the shape will be substantially circular or eliptical.

The inner tube may be extruded, pressed or otherwise formed as a unitary, unbroken structure with the pairs of upper and lower projections being unbroken protrusions or wings extending in a horizontal plane from each side of the general cross sectional shape of the tube. In this configuration, the approximately 180° curvature that the tube wall passes through at the extreme end of the horizontal protrusion is a curvature produced during formation of the tube. No strain occurs in the elastomer wall at this vicinity during compression and expansion because it does not flex from a small curvature to a very large one.

In an alternative design, the inner tube is constructed from two flat strips of elastomer which are contiguously aligned and are chemically or mechanically joined along the longitudinal edges. The joined longitudinal edges form pairs of upper and lower lips which are the horizontal projections. In this design, the mechanical or chemical junction functions like the highly curved wall at the extreme edge of the protrusions of the unitary design. Failure of the mechanical or chemical junction is avoided because flexion and extension within this vicinity does not pass through a large radial curvature.

The outer, upper and lower sections of the semirigid hose are sized and shaped to fit the upper and lower portions of the inner tube defined by the walls of the inner tube above and below the horizontal plane through the projections when the tube is in an expanded state. The inside walls of the sections are permanently bonded to the corresponding outside walls of the inner tube. It is essential that the radial dimension of the outer sections be smaller than the radial dimension of the inner tube in the unassembled expanded state. This relationship causes extension of the pairs of projections outwardly and horizontally from the upper and lower edges of the upper and lower hose sections. Accordingly, the edges of the hose sections are positioned inward from the extreme horizontal edges of the inner tube projections. In an assembled, expanded state, the inner tube walls along the vicinity of the longitudinal edges of the hose sections pass through about a 60° to 120° curvature when flexing from an expanded to a collapsed state. This curvature is significantly less than the 180° curvature for flexion required for complete collapse of single body uniform walled tubing such as surgical tubing which is known in the art. The lack of excessive flexion and compression of the walls of the inner tube of the invention accordingly significantly lessens the wall failure rate produced by repeated flexion and compression.

The outer sections of hose are constructed from semirigid but flexible elastomer. A preferred design will include ribs molded into the outer surfaces of these sections. Appropriate elastomers include medium to high density polyethylene and polypropylene, highly cross linked polyolefins, cross linked polycarbonates, cross linked polyurethanes, cross linked polyesters, and cross linked polyamids.

The inner tube is constructed from highly flexible elastomer having a high coefficient of elasticity. Typical examples include low density polyethylene and polypropylene, plastomers, lightly cross linked polyolefins, lightly vulcanized rubbers, polycarbonates, polyurethanes, polyesters and polyamids of low molecular orientation and high elasticity. In general, those skilled in the art understand the characteristics and identities of polymers meeting the elastomer requirements for the inner tube and the outer hose sections.

In order to recover efficiently the dissipating kinetic energy from a moving vehicle, it has been found that the positional arrangement of the collapsible bodies with respect to the direction of vehicular travel is important. When a vehicle is moving at a reasonable rate of speed, the energy is most effectively transferred to the working fluid by an arrangement wherein the longitudinal dimension of the collapsible bodies is parallel to the direction of vehicular travel. This permits the longest possible contact time of the vehicle and the collapsible body. In addition, vehicular movement along the longitudinal dimension of the body causes expulsion of the entire volume of fluid within the body because the compressive force of the vehicular weight collapsing the body is moved from one end to the other. This expulsive action and the large volume of fluid caused to flow produces a very large head of fluid pressure.

When a vehicle is barely moving, the contact time with a body having its longitudinal dimension arranged transversely to the direction of vehicular travel is sufficiently long to cause complete collapse of the body and corresponding expulsion of a large volume of working fluid. Therefore, another preferred design is one taking advantage of the expulsive action caused by compressive force along a substantially parallel positioned body and the instantaneous collapse of a substantially perpendicular body. In this preferred design, the collapsible bodies are arranged with their longitudinal dimensions substantially diagonal to the direction of vehicular travel.

With any of these designs, fluid is pumped from the collapsible bodies into the output manifold positioned proximate the roadway and hence through connecting means to the accumulator and turbine-generator. An input manifold is connected to the other side of the collapsible bodies and is also positioned proximate to the roadway. The input manifold is interconnected to a pond or other fluid source and permits replenishment of the working fluid when the collapsible bodies resiliently expand after vehicular pressure is removed.

A preferred arrangement of the network of collapsible bodies and the input and output manifolds is a herringbone construction with the output manifold positioned substantially in the middle of the network and the collapsible bodies substantially diagonally positioned and feeding into it through their outlets. Input manifolds are connected to the inlets of the compressible bodies at the longitudinal edges of the herringbone construction. The manifolds may be rigid tubes or may be elastic and have the same general characteristics and shape as the collapsible bodies. When the manifolds are rigid, a plate shaped undercarriage structure with a channel containing the middle output manifold will form a bed for the herringbone network. The input manifolds will also lie in channels positioned at the longitudinal sides of the plate bed.

In a preferred version of the herringbone network, the input and output manifolds have the same shape and characteristics as the compressible bodies. In particular, the output manifold will have a substantially eliptical cross sectional shape with the long axis being horizontal and substantially larger than the radial dimension of the collapsible bodies and the short axis of the output manifold being about the same size as the radial dimension of the collapsible bodies.

A complete fluid pumping structure containing the network of collapsible bodies and the input and output manifolds as well as associated one way valves may be constructed from two large sheets of elastomer press molded or otherwise formed to make the tubes comprising the bodies and input and output manifolds. If the three part body structure is used, individual sections of semirigid hose sized to fit over the upper and lower parts of the molded tubes are chemically bonded to the outer walls of the tube network present in the press molded sheets. The entire structure then comprises a blanket containing the network of bodies and manifolds for working fluid pumping. The blanket can easily be placed on a roadway and a pressure sheet positioned over it so that it may function as a fluid pumping device. When no longer needed, the pressure sheet and the network blanket can easily be removed without harm to the existing roadway.

The flexible pressure sheet substantially distributes the force and pressure of the moving vehicle across the network of collapsible bodies and to a somewhat lesser extent in the longitudinal direction. In a typical design, the sheet is a mat of rigid, strong, substantially box-shaped solid segments arranged in a series with their long dimensions perpendicular to the direction of vehicular travel and interconnected by flexible joints. The segments may be wood or concrete and the joints are flexible elastomer strips mechanically joined or chemically bonded to the segments. Bolts, hooks, double holed washers and other connecting fixtures of similar design may be used to connect detachably the flexible joints and segments in series.

The apparatus including the design of the collapsible bodies, the types of network arrangements, the pressure sheet design and the schematic and function of the entire apparatus are further illustrated by the following discussion of the features depicted by the Figures.

FIG. 1 is a schematic drawing of an apparatus illustrating the general principles underlying the invention. As shown, a supply of water or other fluid, stored in reservoir 360, is connected by connecting pipe 131 to collapsible body network B which pumps the fluid in response to vehicular pressure and motion as shown by wheel A. The compressible body network is preferably aligned with the direction of motion of the moving vehicle or at a diagonal to it. When the wheel rolls onto the compressible network, the compressible bodies in the vicinity of the wheel are compressed by the weight distributed by pressure sheet 200, and the forward motion of the vehicle collapses successive portions of the bodies expelling the substantially entire volume of working fluid into output conduit 121. From conduit 121, the working fluid flows through one way valve 150 and T-joint 160 into storage reservoir 300.

In the illustrated embodiment, reservoir 300 is a gravity storage water tower elevated above the point of use, for later recovery of the stored potential energy by allowing the water to flow downhill. In addition, water can be pumped into a valved tank wherein the trapped air is allowed to escape from the valve. A compressed air tank, operated by employing air as the working fluid in some of the collapsible bodies, is connected to the valved tank. When desired, the water tank valve is closed, compressed air let into the tank and the stored water caused to run the turbine.

T-joint 160 between accumulator 300 and one way valve 150, also makes connection to the input of turbine 310. Turbine 310 is mechanically coupled to electric generator 320. It also may be coupled to mechanical devices for use of the turbine produced mechanical energy. Electric energy can be taken from generator 320, shown here as a DC generator, at terminals 330 and also can be stored as available DC energy in storage battery 340. Spent water from turbine 310 is returned to the working fluid source here supply reservoir 360 by pipe 350.

Generally, the method of the invention as illustrated in FIG. 1, comprises the steps of compressing the network for pressurizing the working fluid and forcing it under pressure into an output manifold, by the motion of a vehicle over the network and, converting the working fluid volume and pressure head thus produced into mechanical or electrical energy by means known to those skilled in the art. At the same time, some of the working fluid pumped can be stored in an accumulator. The energy thus stored can be converted into mechanical or electrical energy, when the working fluid is not being supplied from the network, by utilizing the pressure head built up in the accumulator.

Figure 2:
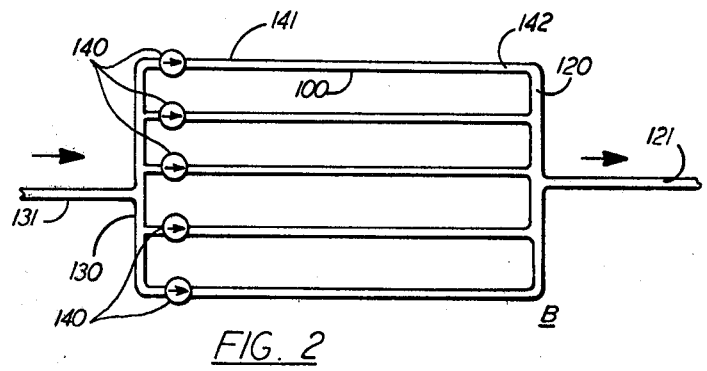
FIG. 2 is a schematic representation of the network of collapsible bodies, and input and output manifolds over which a vehicle travels.

FIG. 2 is a schematic diagram of one embodiment of network B of FIG. 1. The collapsible bodies 100 are arranged so that their longitudinal dimensions are parallel to the direction of vehicular travel. The working fluid supply is delivered to network B through a pipe, conduit or similar device 131. Pipe 131 is connected to manifold 130 which distributes the working fluid to inlets 141 of the collapsible bodies 100 through one way valves 140. Collapsible bodies 100 have compression spaces along their entire lengths to outlets 142 which are connected to output manifold 120. Output manifold 120 collects the pressurized working fluid and passes it to the conducting pipe or conduit 121. Movement of the vehicle along the direction of travel causes expulsive action from the inlet to the outlet and expels the working fluid contained in bodies 100. After passage of the vehicle over bodies 100, their resiliency restores them to their former expanded configuration and this action draws in supplemental working fluid from input manifold 130 through the one way valves 140.

Figure 3:
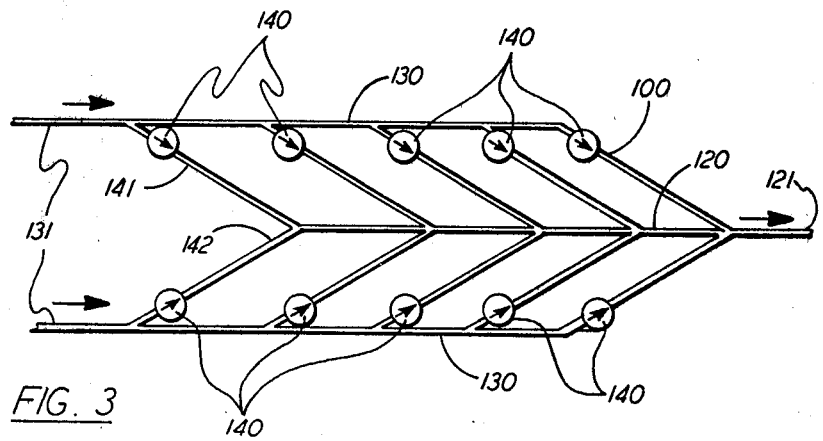
FIG. 3 is a schematic representation of another embodiment of the network, wherein the body and manifold arrangement has a herringbone configuration.

FIG. 3 illustrates a preferred tubing network embodiment wherein the collapsible bodies are substantially diagonally positioned with respect to the direction of vehicular travel. This arrangement causes collapse of the bodies across the larger section while at the same time achieving expulsive action in the bodies 100 and manifold 120. Delivery conduit 131 provides working fluid to the input manifold 130 displaced along either side of the herringbone network formed by collapsible bodies 100. One way valves connect the input manifold 130 with collapsible body inlets 141. The pressurized column of working fluid expelled through collapsible tubes 100 is delivered through outlets 142 to output manifold 120 positioned in the center of the herringbone network. Output manifold 120 has the same shape and configuration as the collapsible bodies but is of larger size. Its vertical dimension, however, is the same or is approximately the same as the vertical dimension of the collapsible bodies. In this manner, a smooth road surface is maintained and all parts of the network contact the road bed. A larger size of the output manifold is preferable so that efficient collection of the pressurized working fluid can be obtained. The column of working fluid in the output manifold is delivered to the rest of the apparatus through output conduit 121.

Figure 4:
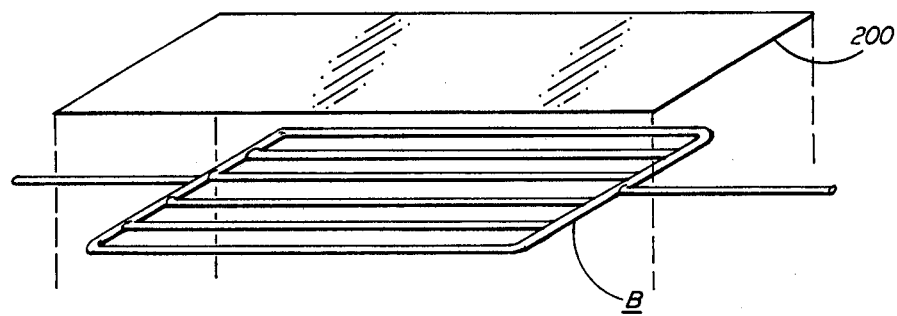
FIG. 4 is a perspective view of the network of collapsible bodies overlaid with a flexible pressure sheet.

FIG. 4 illustrates a perspective view of the overlaying arrangement of pressure sheet 200 and network B. Pressure sheet 200 distributes the vehicular weight and motion laterally across the network and to a lesser extent longitudinally along the direction of travel. Pressure sheet 200 is contiguously aligned with network B and both are positioned on top of the roadway. Associated platforms and inclined planes for approach to and exit from the pressure sheet can be utilized to provide a smooth passage thereover.

Figure 5A:
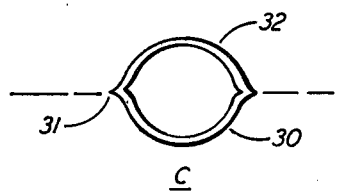
FIGS. 5a and 5b presents two cross sectional views of the collapsible body showing the stiffened upper and lower walls and elastic lateral sides. View C is an expanded body and view D is a partially flattened body.
Figure 5B:
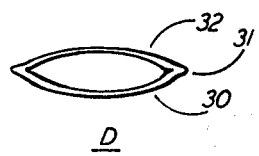

FIGS. 5a and 5b illustrates two schematic views of a generalized cross section of a collapsible body 100. View C is an expanded form and View D is a partially flattened form. Upper wall 32 and lower wall 30 are stiffened with semiflexible polymer or with a thickened shape. Lateral sides 31 are highly elastic and adopt a substantially flattened shape in a relaxed state as shown in View D. The lateral sides 31 may be of a unitary, unbroken construction or may be of two part construction joined along the longitudinal edges as shown in View C.

Figure 6:
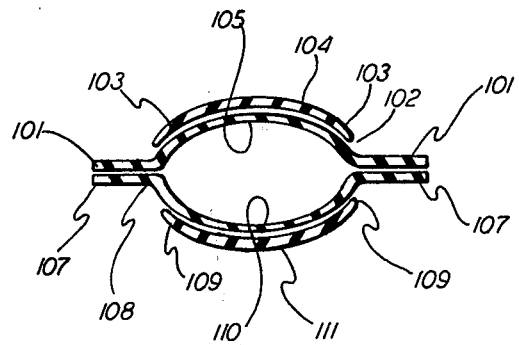
FIG. 6 is a cross sectional view of the collapsible body, showing the inner tube and the outer hose sections.

FIG. 6 illustrates a schematic view of a detailed cross section of a preferred collapsible body 100. The collapsible body is a three part structure comprising an inner tube of upper 105 and lower 110 portions and upper 104 and lower 110 hose sections. The inner tube 105/110 is arranged with horizontal projections along the longitudinal sides of its upper portions and lower portions. The upper projection 101 aligns with and is joined to the lower projection 107 in a continuous, unbroken manner or by a mechanical or chemical bond. Inner tube 105/110 flexes in the vicinity of curvature 102 as it is expanded and contracted. Curvature 102/108 is abutted by upper 103 and lower 109 longitudinal edges of hose sections 104/111. Compression and flexion of collapsible body 100 causes a change in the curvature of the wall of inner tube 105/110 along the vicinity of curvature 102/108. Upper 104 and lower 111 sections of hose collapse so that the inner surfaces of the walls of inner tube 105/110 contact each other. With this design, extreme flexion and compression of the walls of the collapsible body are avoided and the failure rate is greatly lessened.

Figure 7:
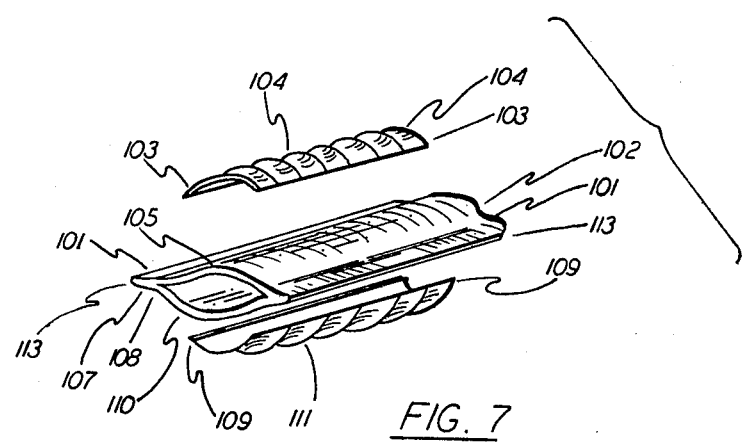
FIG. 7 is a perspective view of the collapsible body wherein the inner tube is an unbroken, unitary structure.

FIG. 7 is a perspective view of a collapsible body 100 having a unitary inner tube structure. Upper 101 and lower 107 projections are unitary and form a protrusion extending horizontally from the body of inner tube 105/110. The single unitary wall extending from upper projection 101 to lower projection 107 forms curvature 113 which is created during the formation of the inner tube. Accordingly, the molecular orientation of the elastomer polymer the vicinity of curvature 113 adopts approximately a sharp curvature in a relaxed state. This avoids strain on the inner tube at this position. The other features of the unitary structure collapsible body illustrated by FIG. 6 are the same as those foregoing numbered features in FIG. 5. Flexion and compression of the inner wall in the vicinity of curvature 102/108 passes through about a 60° to 120° radian and does not subject the inner tubing wall to an extreme curvature change.

Figure 8:
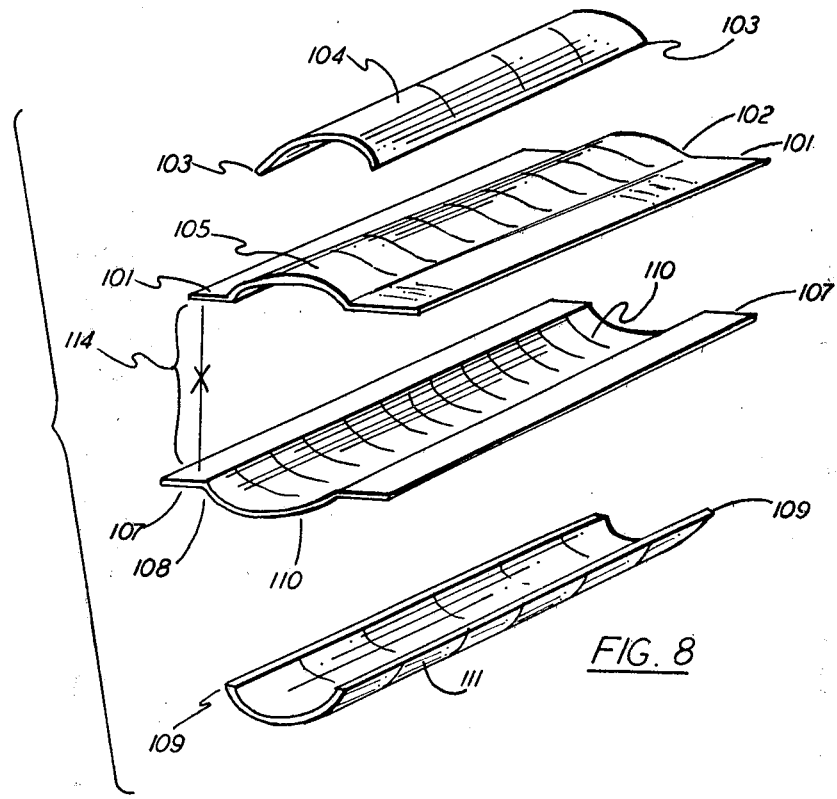
FIG. 8 is a perspective view of a collapsible body formed wherein the inner tube is formed from two flat strips of elastomer.

FIG. 8 illustrates another embodiment of collapsible body 100 wherein inner tube 105/110 is formed by mechanical or chemical joinder of separate elastomer strips. In this embodiment, upper projection 101 is contiguously aligned with lower longitudinal projection 107 and joinder along position 114 is accomplished by chemical bonding or mechanical clamping. Each pair of upper and lower projections extends horizontally through the longitudinal space provided by upper 103 and lower 109 longitudinal edges of the hose sections 104/111. The arrangement is equivalent in all respects to the unitary structure depicted in FIG. 7 and the chemical bond along position 114 takes the place of curvature 113.

Figure 9:
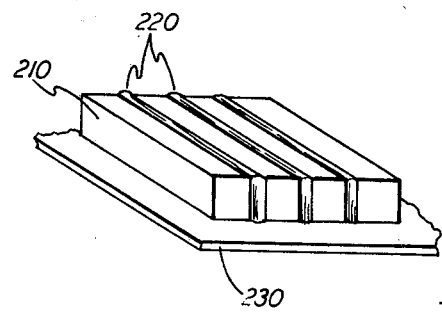
FIG. 9 is a perspective view of a segmented, flexible, jointed pressure sheet.

FIG. 9 depicts a perspective view of a preferred embodiment of pressure sheet 200. In this design, substantially box-shaped solid segments 210 are arranged in series and joined by flexible joints 220. Segments 210 are made of wood or cement and the flexible joints are flexible elastomer strips chemically bonded to the vertical sides of the segments. Optionally, flexible plastic plate 230 is aligned underneath the segmented sheet and is chemically bonded thereto. As a vehicle travels over the flexible sheet, the surfaces of the segments provide as nearly as possible the same friction and interaction characteristics as the roadway. The sheet flexes as the vehicle passes over it and presses down upon the underlaying network to compress the collapsible tubes and expells the working fluid. The rigid nature of the segments causes lateral distribution of the weight of the vehicle and the joined connection of the series causes a somewhat smaller longitudinal distribution of the motion of the vehicle.

Figure 10:
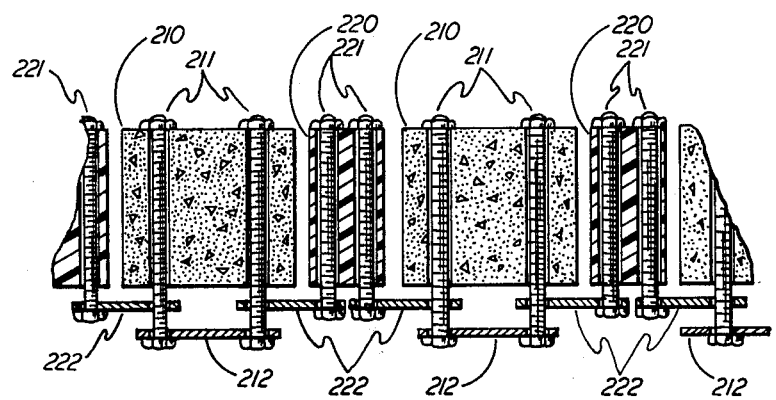
FIG. 10 is a cross sectional view of the segmented, flexible, jointed pressure sheet wherein the individual segments and elastomer strips are mechanically joined by bolts and double holed washers and plates.

FIG. 10 illustrates a schematic view of a mechanically jointed, segmented flexible sheet. Segments 210 and elastomer strips 220 contain two rows of aligned vertical holes through which bolts 211 are placed. The bolts are capped underneath with double holed washers 222 which join the elastomer strips 220 to segments 210. Second double holed washers 212 are added to the rows of bolts along each segment so that the weight and motion of the vehicle pressing downward upon the segment will not split it as a result of horizontal pressure upon the bolts 211 through the segment 210. Double holed connection washers may also be placed on top of the structure to join the parts of aligned bolts in segment 210 and elastomer strip 220. These, however, are not essential because the distance between segments at the top surface is decreased as the weight and the motion of the vehicle presses downwardly.

Figure 11:
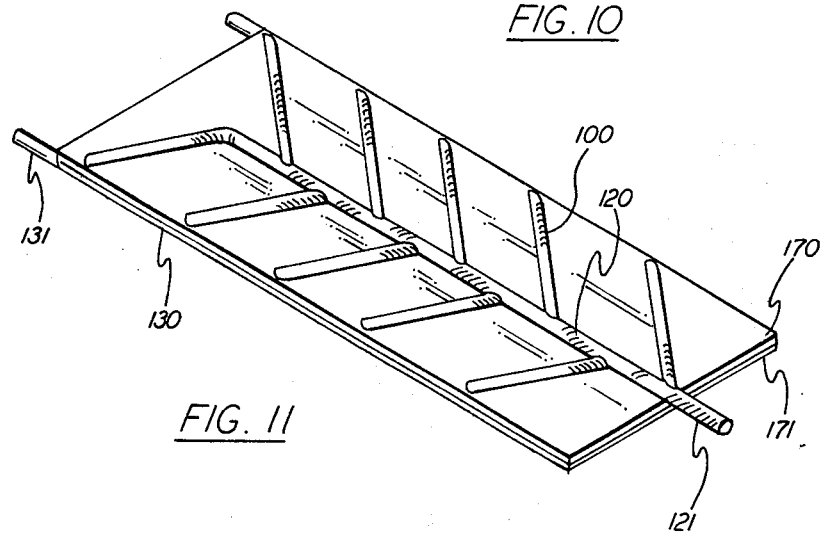
FIG. 11 is a view of a network blanket having the herringbone configuration.

FIG. 11 is a perspective illustration of a network blanket containing the three part structure collapsible bodies and input and output manifolds of a herringbone construction according to FIG. 3. Other network designs can also be manufactured within this embodiment. An upper rubber sheet 170 and lower rubber sheet 171 are press molded to form the upper and lower parts of the inner tube network for the compressible bodies, the inlet and outlets and the input and output manifolds. Each individual inner tube comprising that part of the compressible bodies and the manifolds have the shape of the upper 105 and the lower 110 portions of the inner tube shown in FIG. 8. Essentially upper 170 and lower 171 rubber sheets comprise a number of upper 105 and lower 110 portions of the inner tube depicted in FIG. 7 which have been integrated. Individual upper and lower sections of hose are then placed over the individual inner tubes in order to complete the structure of the network blanket. Joinder of the upper and lower projections of the individual inner tubes and joinder of the hose sections to the outer surface of the inner tube walls are accomplished typically by chemical bonding. The flexible network blanket of this design can be temporarily placed on the road bed and a segmented pressure sheet placed over it in order to produce the pressurizing system for the working fluid. No reconstruction of the underlying roadway is required with this design because the output manifolds and input manifolds are flexible and of the same shape and design as the collapsible bodies. This design advantageously lends itself to temporary replacement of the apparatus upon a roadway and permits quick and easy removal when operation is no longer desired.

Figure 12:
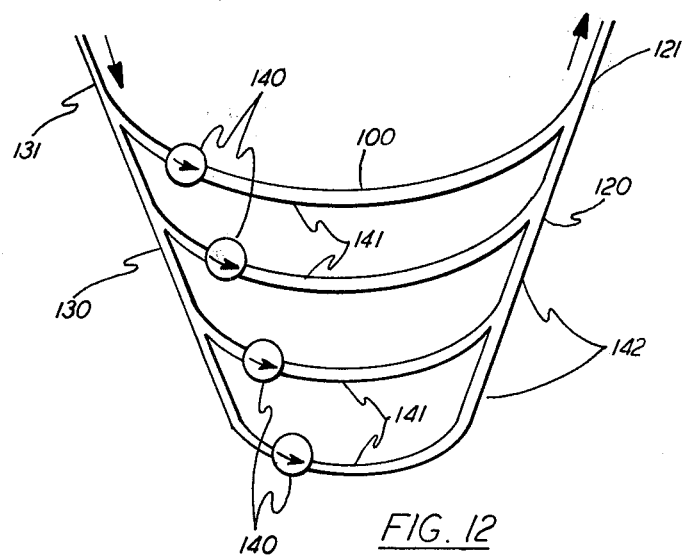
FIG. 12 is a schematic representation of yet another embodiment of the network wherein the output and input manifolds branch into the collapsible bodies.

FIG. 12 is a schematic representation of another embodiment of network B of FIG. 1. Collapsible bodies 100 are arranged so that their longitudinal dimensions are substantially parallel to the direction of vehicular travel. Input manifold 130 branches with curved junctions forming the inlets 141 of the bodies 100. Output manifold 120 branches in the same manner. With this design, the force of the fluid moving through a body 100 is not dissipated by impinging upon a right angle surface of a manifold.

Figure 13:
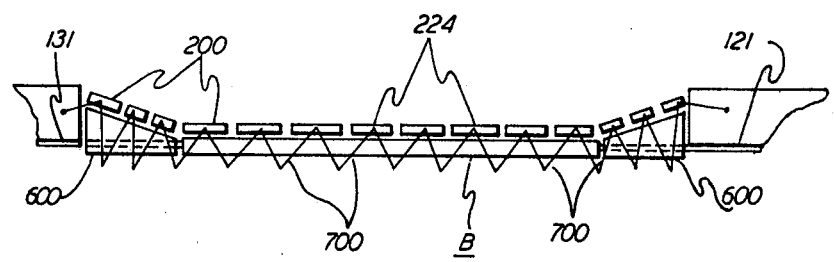
FIG. 13 is a side view of the invention mounted in a road bed and shows side retaining cables for the segmented pressure sheet.

FIG. 13 is a side view of an alternative working application of the invention wherein the network and pressure sheet are permanently mounted in a pit or channel in the roadway. The ends of flexible sheet 200, here shown as a series of box-shaped segments connected by flexible joints, are coterminus with the edges of the roadway channel. The network B lies underneath the sheet 200 and on top of the hard channel floor which typically will be cement. Buttresses 600 at either end of the channel contains passages through which the input and output manifolds or the collapsible bodies of the network pass. The upper surface of each buttress slopes downwardly in order to distribute gradually the weight of the vehicle upon the pressure sheet and network. This arrangement prevents undue strain and breakage of the sheet and network. The ends of segments 210 of the sheet 200 are joined to the channel by a retaining cable arrangement. The cables pass through loops 224 mounted in the ends of the segments and through loops 225 mounted in the channel floor or along the side of the roadway. The retaining cable arrangement prevents rocking or tilting of the segments or of the sheet when they are pushed downward along one side. In addition, the arrangement prevents a rising sheet front ahead of a vehicle moving across it.

A modification of the segmented pressure sheet can also be made so that three adjoining lanes can be covered by the invention. In this modification, the ends of the segments are tapered and have hinged or jointed wings attached thereto. The wings extend outward from the segments and attach to a ridge placed between lanes along the roadway. As the segments are pressed downward, the wings move with respect to the segment so that a gentle, smooth, continuous sloped surface is provided between lanes. Accordingly, a vehicle can change lanes without obstruction while travelling upon the invention.

Figure 14:
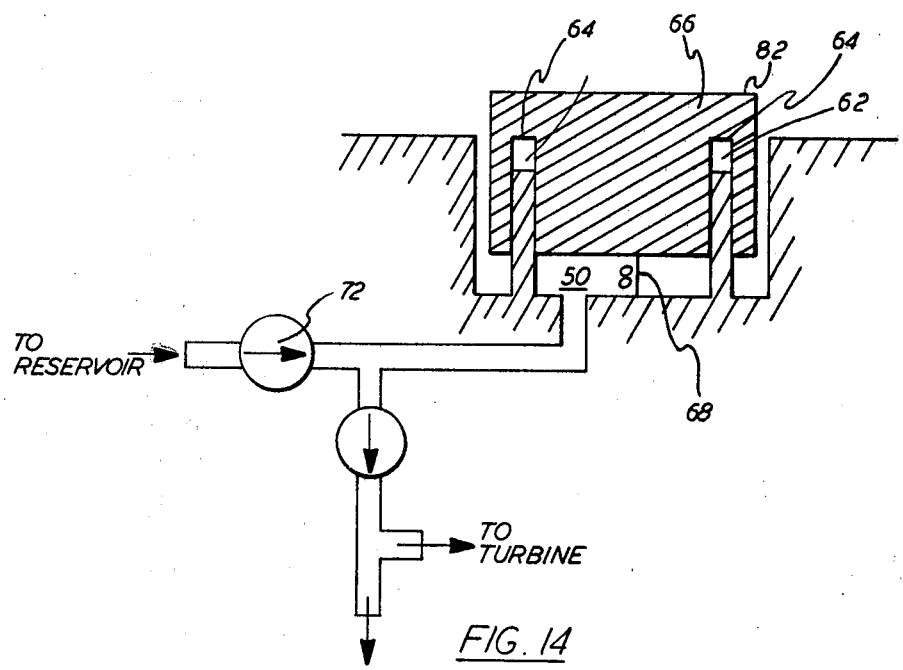
FIG. 14 is a side, cross sectional view of a compressible road bed pump according to the invention.

FIG. 14 is a cross sectional view of a road bed pump. While the view shows the device from one side, it is to be understood that, except for the length dimension, the structure will appear the same as that shown, when viewed from the front. In the compression device of FIG. 9, a compression space 50, into and out of which water may flow, is provided between vertical wall members 62. Wall members 64 terminate in end walls (not shown) and form a trough containing the compression space 50. The upper and lower surfaces of space 50 are provided by the bottom surface of piston element 66 and the floor of the trough. Water can flow into and out of compression space 50 via conduit 70. Conduit 70 is connected via input check valve 72 and supply conduit 74 to a reservoir which supplies feed water to the system, as described above. When water is being discharged from compression chamber 50, it flows from conduit 70 through outlet check valve 76 and conduits 78 and 80, respectively, to a turbine and to an accumulator. In this embodiment of the invention, conduit 70 serves the dual function of inlet and outlet for the fluid.

Piston 66, shown as a solid block, is provided with a recess 64 for receiving vertical wall members 62. Recess 64 is conformably fitted to the vertical wall members, and the sliding interfaces therebetween are sealed by a lubricant. Under certain circumstances, it may be desirable to counterbalance the weight of piston block 66 by means of a spring 68 to provide resilience and thus to assist in filling the compression space. It will be understood by those skilled in the art that the piston structure illustrated here may be elaborated upon by employing sliding metal-to-metal line seals of a type well known in the art. It will also be understood that the structure of FIG. 9 may be made circular about an axis of symmetry passing vertically through spring 68 and that the wall-to-piston seal may then be piston rings of a conventional nature.

In operation, the structure of FIG. 9 is laid in the road bed, with upper surface 82 either forming a part of the road bed or covered by a protective sheet. When the wheel of a vehicle passes over piston 66, the piston, which has been filled with water via inlet check valve 72, is forced downward, and the water now flows out of compression space 50, via outlet check valve 76, to the accumulator and to the turbine, as before.

It will be apparent that the invention, as described in the various foregoing embodiments, has utility in many applications. For example, the energy of vehicles descending downhill on turnpikes and other roads is lost, being dissipated in the form of heat produced by the vehicle braking. By means of the pumping network of collapsible bodies placed on the downhill portions of roadways or along other portions of roadways where braking is to be initiated, energy which would otherwise be dissipated by the brakes can be recovered, since the system removes energy from the vehicle. Other examples include locations where the vehicles are systematically braked to the stop such as toll booths, stop signs, and stop lights.

Those skilled in the art will readily appreciate that further modifications within the scope of the invention can readily be produced according to the concept of the invention.

The following example illustrates that pressure producing characteristics of the three part collapsible body tubing structure.

EXAMPLE

Pressure Produced By The Three Part Collapsible Body Structure

A model of a collapsible body network was prepared from two strips of neoprene elastomer and two semi-circular hose sections cut from a ribbed semirigid hose typically used to conduct hot air from a blower to a hair drying apparatus. The strips were cemented together along the edges to form the inner tube and the hose sections were cemented to the inner tube. One way valves of a plunger design encased in a plastic housing were cemented to the ends of the inner tube so that the valves permitted the flow of fluid through the inner tube in only one direction. Three tubes were joined together in a branching network, the ends of which were the input and output manifolds. The input manifold was then placed in a reservoir filled with water, and the length of the network placed along a horizontal surface with the outlet manifold connected to a pelton turbine. After covering the network with a pressure sheet constructed from wooden segments and sponge rubber, a weighted "exercise" wheel having two rollers and a pair of handles extending from the axle was rolled along the sheet to cause network collapse and expulsion of water.

A variable number of passes were conducted for each run, each pass having the maximum pressure possible applied. The time periods during which the pelton turbine continued to rotate or the number of rotations it made after the last pass of each run were measured. The results are given in Table I.

TABLE I

Pressure Flow Results

| Run Number | Passes | Period of Rotation |
|---|---|---|
| 1 | 1 | 3.75 rotations of turbine |
| 2 | 2 | 6.5 rotations of turbine |
| 3 | 3 | 10 sec |
| 4 | 4 | 14 sec |
| 5 | 5 | 17 sec |
| 6 | 10 | 25 sec |

In a second series of experiments, a surgical tube was substituted for the collapsible body of the foregoing experiment and one way valves were glued to the ends. Under the same conditions and using the same parameters, this tubing was tested for the period of rotation the pressurized column of water imparted to the pelton turbine. The results are presented in Table II.

TABLE II

Surgical Tubing Results

| Run Number | Passes | Period of Rotation |
|---|---|---|
| 1 | 1 | 3 rotations of turbine |
| 2 | 2 | 6.5 rotations of turbine |
| 3 | 3 | 8 sec |
| 4 | 4 | 9 sec |
| 5 | 5 | 10 sec |
| 6 | 10 | 15 sec |

The data summarized in Tables I and II demonstrate that the resilient, collapsible bodies of the invention will cause expulsion of a significantly higher volume of working fluid under a higher pressure than single wall tubing such as surgical tubing does.

What is claimed is:

1. An apparatus for recovering energy from a moving vehicle on a roadway by causing a working fluid to flow therefrom, which comprises:
    a network of collapsible, resilient bodies, an input manifold and an output manifold coupled thereto wherein each body comprises a structure allowing substantially complete working fluid expulsion therefrom, an inlet connected to the input manifold and an outlet connected to the output manifold, the network forming part of the roadway and having a surface adapted for passage of a vehicle, each body comprising an inner elastic tube and outer, upper and lower sections of semirigid hose, the tube having upper and lower portions with integral projections extending substantially horizontally from the longitudinal sides of each portion, each pair of upper and lower projections forming a continuous, unbroken protrusion or being permanently or detachably joined, the upper and lower portions of the tube being concentrically joined to the upper and lower sections of hose, the radial dimensions of each hose section being smaller than the radial dimension of the corresponding inner tube portion measured from the extreme horizontal ends of the projections;
    a working fluid source coupled to the input manifold;
    a means for converting a volume of pressurized working fluid into mechanical or electrical energy;
    a means for accumulating a pressure head of working fluid; and
    the means for converting and means for accumulating being connected in series or in parallel through a one-way valve to the output manifold.

2. An apparatus according to claim 1 which further comprises a flexible pressure sheet adapted for passage of a vehicle and for evenly distributing the weight thereof, which overlays the network.

3. An apparatus according to claim 2 wherein the sheet is a mat of rigid, strong, substantially box-shaped solid segments arranged in a series with their long dimensions perpendicular to the direction of vehicular travel and interconnected by flexible joints.

4. An apparatus according to claim 3 wherein the segments are wood or concrete and the joints are flexible elastomer strips mechanically joined or chemically bonded to the segments.

5. An apparatus according to claim 3 wherein the segments are wood or concrete and the joints are flexible elastomer strips, the strips and segments each having two rows of mutually aligned vertical holes, bolts through the holes, a first type of double holed metal washer fitted over each pair of aligned bolts derived from the row of bolts in each strip and the adjacent row of bolts in each segment and a second type of double holed metal washer fitted over each pair of aligned bolts in the segments.

6. An apparatus according to claim 3 which further comprises a flexible plastic plate joined to the bottom of the series of segments.

7. An apparatus according to claim 1 wherein the longitudinal dimension of each body is substantially parallel to the direction of vehicular travel.

8. An apparatus according to claim 1 wherein the length of each body is substantially diagonal with the direction of vehicular travel.

9. An apparatus according to claim 8 wherein the network has a herringbone configuration with the outlets of the bodies connected to an output manifold positioned substantially in the middle of the network, and the inputs connected to input manifolds positioned along either edge of the network, the output and input manifolds being positioned substantially parallel to the direction of vehicular travel.

10. An apparatus according to claim 9 wherein each input and output manifold is resilient, substantially completely collapsible and has the same design and structure as the bodies.

11. An apparatus according to claim 9 wherein each input and output manifold is resilient, collapsible and comprises:
    an elastic, two portion inner tube with projections extending horizontally from the longitudinal sides of each of the upper and lower portions concentrically joined to outer, upper and lower sections of semirigid hose, the radial dimension of each section being smaller than the radial dimension of a corresponding inner tube portion measured from the extreme horizontal ends of the projections.

12. An apparatus according to claim 11 wherein the tube and hose have substantially eliptical cross sectional shapes with horizontal long axes.

13. An apparatus according to claim 11 wherein the vertical dimension of the output manifold is essentially the same as the radial dimension of the bodies and the horizontal dimension of the output manifold is substantially larger than the radial dimension of the bodies.

14. An apparatus according to claim 1 wherein each body generally has a substantially circular or eliptical cross sectional shape.

15. An apparatus according to claim 1, 9, 10, 11, 12 or 13 wherein the tube has a naturally flat, completely collapsible shape in its unassembled state.

16. An apparatus according to claim 1 wherein each tube comprises two flat, contiguously aligned strips of elastomer mechanically or chemically joined along the longitudinal edges.

17. An apparatus according to claim 16 wherein the sections of hose are ribbed.

18. An apparatus according to claim 1 wherein the network comprises two sheets of elastomer press molded to form the inner tubes of the bodies, input and output manifolds and individual sections of hose bonded to the molded tubes.

19. An apparatus according to claim 1 wherein each tube comprises a unitary structure with each pair of upper and lower projections forming a continuous, unbroken protrusion.

20. An apparatus according to claim 1 wherein each inlet is connected to the input manifold through a one way valve.

21. An apparatus according to claim 1 wherein the means for accumulating is a water storage reservoir.

22. An apparatus according to claim 1 wherein the means for concerting to mechanical energy is a turbine.

23. An apparatus according to claim 1 wherein the means for converting to electrical energy is a turbine powered electric generator.

24. An apparatus according to claim 1 wherein the working fluid is water.

25. An apparatus according to claim 16 wherein the sections of hose are ribbed.

26. An apparatus according to claim 14 wherein the output and input manifolds branch into the collapsible bodies.

27. An apparatus according to claim 3 wherein the ends of the segments are tapered along their upper surface and have mating wings movably fastened thereto, said wings coupled to a ridge placed between lanes of a roadway, said ridge coupling said sheet to a second sheet and allowing vehicles to smoothly change lanes from said first sheet to said second sheet when travelling over said network.

* * * * *

UNITED STATES PATENT AND TRADEMARK OFFICE
CERTIFICATE OF CORRECTION

PATENT NO. : 4,409,489
DATED : October 11, 1983
INVENTOR(S) : THOMAS J. HAYES

It is certified that error appears in the above—identified patent and that said Letters Patent is hereby corrected as shown below:

In claim 15, "9, 10, 11, 12 or 13" should be --2, 3, 4, 5 or 6--.

In claim 25, "16" should be --9--.

In claim 26, "14" should be --7--.

Signed and Sealed this

Seventeenth Day of January 1984

[SEAL]

Attest:

GERALD J. MOSSINGHOFF

Attesting Officer

Commissioner of Patents and Trademarks